US008676564B2

(12) United States Patent
Nasukawa et al.

(10) Patent No.: US 8,676,564 B2
(45) Date of Patent: *Mar. 18, 2014

(54) METHOD, PROGRAM AND SYSTEM FOR FINDING CORRESPONDENCE BETWEEN TERMS

(75) Inventors: Tetsuya Nasukawa, Kanagawa-ken (JP); Raymond Harry Rudy, Kanagawa-ken (JP); Yuta Tsuboi, Kanagawa-ken (JP); Yao-zhong Zhang, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,292

(22) Filed: Aug. 22, 2012

(65) Prior Publication Data

US 2012/0316863 A1 Dec. 13, 2012

Related U.S. Application Data

(63) Continuation of application No. 13/413,866, filed on Mar. 7, 2012.

(30) Foreign Application Priority Data

Mar. 8, 2011 (JP) .................................. 2011-050830

(51) Int. Cl.
*G06F 17/28* (2006.01)
*G06F 17/20* (2006.01)
(52) U.S. Cl.
USPC ......................................... 704/2; 704/7; 704/8
(58) Field of Classification Search
USPC ........................................................ 704/2–9
See application file for complete search history.

(56) References Cited

U.S. PATENT DOCUMENTS 8,069,027 B2 * 11/2011 Liu et al. ............................ 704/2
8,438,011 B2 * 5/2013 Udupa et al. ..................... 704/9
(Continued)

FOREIGN PATENT DOCUMENTS

JP 2002-009165 3/2002
JP 2002091965 A 3/2002
(Continued)

OTHER PUBLICATIONS

Michelbacher et al, Building a crosslingual relatedness thesaurus using a graph similarity measure. In Proceedings of the Seventh International Conference on Language Resources and Evaluation (LREC10), Valletta, Malta, May 19-21 2010, pp. 1363-1367.*

(Continued)

*Primary Examiner* — Richemond Dorvil
*Assistant Examiner* — Olujimi Adesanya
(74) *Attorney, Agent, or Firm* — Cahn & Samuels, LLP

(57) ABSTRACT

A computer implemented method, system, and product for finding correspondence between terms in two different languages. The method includes the steps of: creating a technical term set and a general term set for each of i) a first language and ii) a second language, creating two bipartite graphs, where each graph corresponds to one of the two languages, and connects the technical term set and general term set of each language, respectively, with weighted links based on corpus information, creating a third bipartite graph by creating weighted links between general terms in the first language and general terms in the second language by using a translation dictionary, creating an association matrix M corresponding to the three bipartite graphs, calculating a similarity matrix Q by calculation of an inverse matrix, and outputting correspondence between the technical term sets of the first and second language on basis of the similarity matrix.

10 Claims, 10 Drawing Sheets

(56) References Cited

U.S. PATENT DOCUMENTS

| | | | |
|---|---|---|---|
| 2006/0190241 A1* | 8/2006 | Goutte et al. | 704/2 |
| 2007/0150256 A1 | 6/2007 | Lee | |
| 2007/0174040 A1* | 7/2007 | Liu et al. | 704/2 |
| 2009/0164456 A1* | 6/2009 | Slaney et al. | 707/5 |
| 2009/0271177 A1* | 10/2009 | Menezes et al. | 704/2 |
| 2010/0185689 A1* | 7/2010 | Hu et al. | 707/803 |
| 2011/0166850 A1* | 7/2011 | Achtermann et al. | 704/9 |

FOREIGN PATENT DOCUMENTS

| | | |
|---|---|---|
| JP | 2002-0269085 | 9/2002 |
| JP | 2004-0280316 | 9/2002 |
| JP | 2004-0280346 | 10/2004 |
| JP | 2004-0302926 | 10/2004 |
| JP | 2007-0128389 | 5/2007 |
| JP | 2007518164 A | 7/2007 |
| JP | 2008-0083849 | 4/2008 |
| JP | 2008-0146218 | 6/2008 |
| JP | 2010055298 A | 3/2010 |

OTHER PUBLICATIONS

Noh et al, "An automatic translation of tags formultimedia contents using folksonomy networks", 2009, in SIGIR '09, pp. 492-499.*

Gao et al, "Using English Information in Non-English Web Search", 2008, in iNEWS '08, pp. 17-24.*

Erkan et al, "LexRank: Graphbased centrality as salience in text summarization", 2004, Journal of Artificial Intelligence Research, pp. 457-479.*

Jeh et al, "Simrank: A measure of structural-context similarity", 2002, in KDD '02, pp. 538-543.*

Zhou et al, Goon: A Graph-Based Technique for Resolving ambiguity in query translation candidates, 2008, in SAC '08 Proceedings of the 2008 ACM symposium on Applied computing pp. 1566-1573.*

Lam et al, "Named entity translation matching and learning: With application for mining unseen translations", 2007, ACM Trans. Inf. Syst. 25, 1, 1-32.*

Ma et al, "Learning latent semantic relations from clickthrough data for query suggestion", 2008, in CIKM, pp. 709-718.*

Komachi et al, "NAIST-NTT System Description for Patent Translation Task at NTCIR-7", 2008, Proceedings of NTCIR-7 Workshop Meeting, Dec. 16-19, 2008, Tokyo, Japan, pp. 1-6.*

Guihong Cao, Jianfeng Gao, Jian-Yun Nie, Jing Bai, "Extending query translation to cross-language query expansion with markov chain models." CIKM '07 Proceedings of the sixteenth ACM conference on Conference on information and knowledge management.

Daniel Andrade, Tetsuya Nasukawa, Jun'ichi Tsujii, "Robust measurement and comparison of context similarity for finding translationpairs," COLING '10 Proceedings of the 23rd International Conference on Computational Linguistics.

English abstract of JP2010055298 (A).
English abstract of JP2002091965 (A).
English abstract of JP2007518164 (A).

* cited by examiner $$M = \begin{array}{c} \\ g_1 \\ g_2 \\ g_3 \\ g_4 \\ g_5 \\ g_6 \\ \vdots \end{array} \begin{pmatrix} s_1 & s_2 & s_3 & s_4 & \cdots \\ M_{11} & 0 & 0 & 0 & \cdots \\ M_{21} & 0 & 0 & 0 & \cdots \\ 0 & M_{32} & 0 & 0 & \cdots \\ 0 & 0 & M_{43} & 0 & \cdots \\ 0 & 0 & M_{53} & 0 & \cdots \\ 0 & 0 & 0 & M_{64} & \cdots \\ \vdots & \vdots & \vdots & \vdots & \end{pmatrix}$$

Figure 6

$$M = \begin{array}{c} \\ |J_S| \\ |J_G| \\ |E_G| \\ |E_S| \end{array} \begin{array}{cccc} |J_S| & |J_G| & |E_G| & |E_S| \\ \left( \begin{array}{cccc} 0 & A_1 & 0 & 0 \\ A_1^T & 0 & A_2 & 0 \\ 0 & A_2^T & 0 & A_3 \\ 0 & 0 & A_3^T & 0 \end{array} \right) \end{array}$$

EACH ROW IS NORMALIZED

Figure 7

$$Q = (I - cM)^{-1} = \begin{array}{c} |J_S| \\ |J_G| \\ |E_G| \\ |E_S| \end{array} \begin{array}{c} |J_S| \quad |J_G| \quad |E_G| \quad |E_S| \\ \left[ \begin{array}{cccc} I & -cA_1 & 0 & 0 \\ -cA_1^T & I & -cA_2 & 0 \\ 0 & -cA_2^T & I & -cA_3 \\ 0 & 0 & -cA_3^T & I \end{array} \right]^{-1} \end{array}$$

$$= \begin{array}{c} |J_S| \\ |J_G| \\ |E_G| \\ |E_S| \end{array} \begin{array}{c} |J_S| \quad |J_G| \quad |E_G| \quad |E_S| \\ \left[ \begin{array}{cccc} Q_{11} & Q_{12} & Q_{21} & Q_{22} \\ Q_{13} & Q_{14} & Q_{23} & Q_{24} \\ Q_{21}^T & Q_{23}^T & Q_{31} & Q_{32} \\ Q_{22}^T & Q_{24}^T & Q_{33} & Q_{34} \end{array} \right] \end{array}$$

Figure 9

$$Q' = (I - cM')^{-1} = \begin{pmatrix} \boxed{\begin{matrix} I & -cA_1 \\ -cA_1^T & I \end{matrix}} & \begin{matrix} 0 & 0 \\ 0 & 0 \end{matrix} \\ \begin{matrix} 0 & 0 \\ 0 & 0 \end{matrix} & \boxed{\begin{matrix} I & -cA_3 \\ -cA_3^T & I \end{matrix}} \end{pmatrix}^{-1}$$

RANDOM WALK ON JAPANESE GENERAL TERM SET AND JAPANESE SPECIALIZED TERM SET (upper-left block)

RANDOM WALK ON ENGLISH GENERAL TERM SET AND ENGLISH TECHNICAL TERM SET (lower-right block)

$$= \begin{pmatrix} Q'_{11} & Q'_{12} & 0 & 0 \\ Q'_{13} & Q'_{14} & 0 & 0 \\ 0 & 0 & Q'_{31} & Q'_{32} \\ 0 & 0 & Q'_{33} & Q'_{34} \end{pmatrix}$$

Figure 10

METHOD, PROGRAM AND SYSTEM FOR FINDING CORRESPONDENCE BETWEEN TERMS

CROSS-REFERENCE TO RELATED APPLICATION

This application is a continuation of and claims priority from U.S. application Ser. No. 13/413,866 filed Mar. 7, 2012, which in turn claims priority under 35 U.S.C. §119 from Japanese Patent Application No. 2011-050830 filed Mar. 8, 2011, the entire contents of both applications are incorporated herein by reference.

BACKGROUND OF THE INVENTION

1. Field of the Invention

The present invention relates to a technique to create correspondences between words or terms included in documents, on the basis of existing document information provided as computer-readable information. More particularly, the present invention relates to a technique to create correspondences between words or terms included in documents in different foreign languages.

2. Related Art

Heretofore, for the purpose of translating a document between different languages or utilizing data in multiple languages, it has been necessary to understand appropriate translations and related expressions in accordance with the purpose. For this reason, it is necessary to find correspondences between words or terms in different languages. To achieve this, existing dictionary can be utilized for frequently used words or terms.

However, although there have been prepared many dictionaries showing correspondences between general terms for different languages and technical terms in the same language, quite often, it is difficult to find dictionaries for technical terms between different languages. In the field of automobile industry, for example, "handle" in Japanese corresponds to "steering wheel" in English in automobile data, but also corresponds to "handle" in English in some other data. Such translation words and related words need to be prepared not only between Japanese and English but also between pairs of other languages.

The reason for the underdevelopment of dictionaries for technical terms between different languages is that there are not many individuals who have a skill set to achieve work for preparing such a dictionary because the work requires knowledge in the specialized field in addition to the language knowledge.

In addition, since just a somewhat understandable translation is not sufficient, it is necessary to select a translation from expressions actually used in target data in order to bring the translation to a practical level. The creation of such correspondence requires considerable cost and time, and the creation of translation words and related words by this method in every case is extremely inefficient.

As a prior art patent literature in this field, the following literature is cited.

Japanese Patent Application Publication No. 2002-91965 relates to a dictionary device provided to a natural language processing system used by multiple users and discloses a system including: a dictionary main body in which multiple technical term dictionaries for respective categories are arranged in a hierarchical tree structure with a general term dictionary as its root node; user dictionary registration means for setting a user dictionary in association with a technical term dictionary desired by the user; and applicable dictionary determination means for determining, when a category targeted for natural language processing is designated, that all technical term dictionaries on a path of the tree structure from the technical term dictionary of the category to the general term dictionary, and all of user dictionaries of a process-requesting user associated with the technical term dictionaries are applicable dictionaries.

Japanese Patent Application Publication No. 2002-269085 relates to a machine translation device having a word graph creation unit, a word graph memory and a search selection unit. For a sentence in an original language that is formed of an inputted character string, the word graph creation unit refers to a translation dictionary including multiple pairs of at least one expression in the original language and expressions in at least one target language, checks the expressions against the expression in the original language, extracts the expression in the target language corresponding to the matched language expression, creates a combination of expressions in the target language in a word graph format and stores the combination in the word graph memory. The search selection unit refers to corpus data in the target language, checks a word string on the word graph stored in the word graph memory against the corpus data and counts the appearance frequencies of the words on the word graph in the corpus data and thereby calculates a score of a translation sentence in the target language that corresponds to the sentence in the original language. The search selection unit thus selects an optimum translation sentence in the target language on the basis of the calculated score.

Japanese Patent Application Publication No. 2004-280316 discloses a language processing system for determining a field to which document data belongs and further performing language processing for the document data by using a technical term dictionary and learning data in the determined field. The language processing system includes a basic dictionary including general language information in multiple fields, and technical term dictionaries including language information in specialized fields. In this language processing system, upon input of document data, an analysis unit calculates a word vector of words included in description contents from the inputted document data with reference to the basic dictionary. A field determination unit calculates similarities between field vectors each characterizing a field and the calculated word vector and thereby determines that the field having the largest similarity is a field to which the inputted document data belongs. Then, a language processing unit performs language processing for the inputted document data with reference to the technical term dictionary in the determined field.

Japanese Patent Application Publication No. 2008-146218 discloses a language analysis technique for achieving precise morphological analysis by correctly dividing technical terms, which are difficult to divide, to extract morphemes and thereby creating a morphological analysis dictionary. From registration data of a translation dictionary between Japanese and a foreign language, this language analysis technique extracts a translation tuple registered not as a pair of one Japanese word and one foreign language word but as a tuple of one Japanese word and multiple foreign language words. The Japanese word in the extracted translation tuple is morphologically analyzed and divided into sub-words or sub-word-strings. Then, a foreign language word corresponding to each sub-word or sub-word-string is identified and the sub-word or sub-word-string corresponding to the found foreign word is registered as a morpheme in the morphological analysis dictionary. Thus, the technical terms are morphologically analyzed based on the registered morpheme information.

Japanese Patent Application Publication No. 2010-55298 discloses a system for providing means to meet demand for text mining or search on document data written in a language other than a native language or a proficient language. The system includes: a first extraction unit configured to extract co-occurring terms co-occurring with a concerned term in the first language from a first language corpus; an output unit configured to output translation words in a second language corresponding to at least one of the extracted co-occurring terms; a second extraction unit configured to extract translation candidates co-occurring with at least one of the outputted translation words in the second language from a second language corpus corresponding to the first language corpus; a weighting unit configured to weight each of the extracted translation word candidates; and a creation unit configured to optimize the weights and to create a translation pair list for the concerned term in the first language in accordance with the optimized weights.

Furthermore, the followings are cited as non-patent literatures.

There is disclosed a technique to list, for a query term, a set of similar terms in a different language by a random walk on a directed graph in which nodes represent terms, in Guihong Cao, Jianfeng Gao, Jian-Yun Nie, Jing Bai, "Extending query translation to cross-language query expansion with markov chain models," CIKM '07 Proceedings of the sixteenth ACM conference on Conference on information and knowledge management.

There is disclosed a technique to create a feature vector of each word (technical term) by general terms that co-occur with the word with a high frequency and a high degree of association and thereby to list similar words, in Daniel Andrade, Tetsuya Nasukawa, Jun'ichi Tsujii, "Robust measurement and comparison of context similarity for finding translation pairs," COLING '10 Proceedings of the 23rd International Conference on Computational Linguistics.

The technique using a random walk described in the literature by Guihong Cao et al. appears promising as a technique to list, for a query term, a set of similar terms in a different language but it requires inefficient calculation for creating a graph for each query term due to performing a random walk without taking the structure of the graph into consideration.

In this respect, if an attempt is made to reduce the complexity of calculation by stopping the random walk with a low number of steps, there arises a problem that the technique is no longer appropriate for a term or keyword having a low appearance frequency.

SUMMARY OF THE INVENTION

Accordingly, it is an object of the present invention to provide a technique that makes it possible to list corresponding terms in a different language by using a random walk technique with a reasonable calculation amount even when a large number of terms are targeted.

One aspect of the invention includes a computer implemented method for finding correspondence between terms in two different languages. The method includes the steps of: creating a technical term set in a first language, a general term set in the first language, a technical term set in a second language and a general term set in the second language, saving, in a storage unit of the computer, the term set of the first language, the general term set in the first language, the technical term set in the second language and the general term in the second language, creating at least two bipartite graphs, wherein the first bipartite graph connects the technical term set and the general term set of the first language to each other with links on basis of corpus information, wherein the second bipartite graph connects the general term set and technical term set of the second language to each other with links the basis of corpus information, and wherein each of the links is weighted by a degree of association between terms, creating a third bipartite graph by creating links between general terms in the first language and general terms in the second language by using a translation dictionary between general terms in the first language and general terms in the second language, each of the links being weighted by a degree of association between terms, creating an association matrix M corresponding to the bipartite graphs between the technical term set and the general term set connected in each respective language and the bipartite graph between the general terms in the first language and the general terms in the second language, calculating a similarity matrix Q by calculation of an inverse matrix of $(I-cM)$, where c is a positive number smaller than one, and outputting correspondence between the technical term set in the first language and the technical term set in the second language on the basis of predetermined components of the similarity matrix Q, wherein at least one step is executed on the computer.

Another aspect of the invention includes a computer readable non-transitory program product tangibly embodying computer readable instructions which, when executed, cause a computer to carry out steps of a method for finding correspondence between terms in two different languages. The method includes the steps of: creating a technical term set in a first language, a general term set in the first language, a technical term set in a second language and a general term set in the second language, saving, in a storage unit of the computer, the term set of the first language, the general term set in the first language, the technical terms set in the second language and the general term in the second language, creating at least two bipartite graphs, wherein the first bipartite graph connects the technical term set and the general term set of the first language to each other with links on the basis of corpus information, wherein the second bipartite graph connects the general term set and technical term set of the second language to each other with links on the basis of corpus information, and wherein each of the links is weighted by a degree of association between terms, creating a third bipartite graph by creating links between general terms in the first language and general terms in the second language by using a translation dictionary between general terms in the first language and general terms in the second language, each of the links being weighted by a degree of association between terms, creating an association matrix M corresponding to the bipartite graphs between the technical term set and the general term set connected in each respective language and the bipartite graph between the general terms in the first language and the general terms in the second language, calculating a similarity matrix Q by calculation of an inverse matrix of $(I-cM)$ where c is a positive number smaller than one, and outputting correspondence between the technical term set in the first language and the technical term set in the second language on the basis of predetermined components of the similarity matrix Q.

Yet another aspect of the invention includes a computer system configured to find correspondence between terms in two different languages. The system includes: a unit configured to create a technical term set in a first language, a general term set in the first language, a technical term set in a second language and a general term set in the second language, a storage unit for storing the term set of the first language, the general term set in the first language, the technical terms set in the second language and the general term in the second language, a unit configured to create at least two bipartite graphs, wherein the first bipartite graph connects the technical term set and the general term set of the first language to each other with links on the basis of corpus information, wherein the second bipartite graph connects the general term set and technical term set of the second language to each other with links on the basis of corpus information, and wherein each of the links is weighted by a degree of association between terms, a unit configured to create a third bipartite graph by creating links between general terms in the first language and general terms in the second language by using a translation dictionary between general terms in the first language and general terms in the second language, each of the links being weighted by a degree of association between terms, a unit configured to create an association matrix M including the bipartite graphs between the technical term set and the general term set connected in each respective language and the bipartite graph between the general terms in the first language and the general terms in the second language, a unit configured to calculate a similarity matrix Q by calculation of an inverse matrix of (I−cM) where c is a positive number smaller than one, and a unit configured to output correspondence between the technical term set in the first language and the technical term set in the second language on the basis of predetermined components of the similarity matrix Q.

BRIEF DESCRIPTION OF THE DRAWINGS

FIG. 6 displays a diagram showing a part of an association matrix based on the bipartite graph.

FIG. 7 displays a diagram showing an overall association matrix between the Japanese technical term set, the Japanese general term set, the English technical term set and the English general term set.

FIG. 9 displays a diagram showing calculations of a similarity matrix.

FIG. 10 displays a diagram showing processing to calculate the similarity matrix more simply.

DETAILED DESCRIPTION OF THE PREFERRED EMBODIMENT

Figure 1:
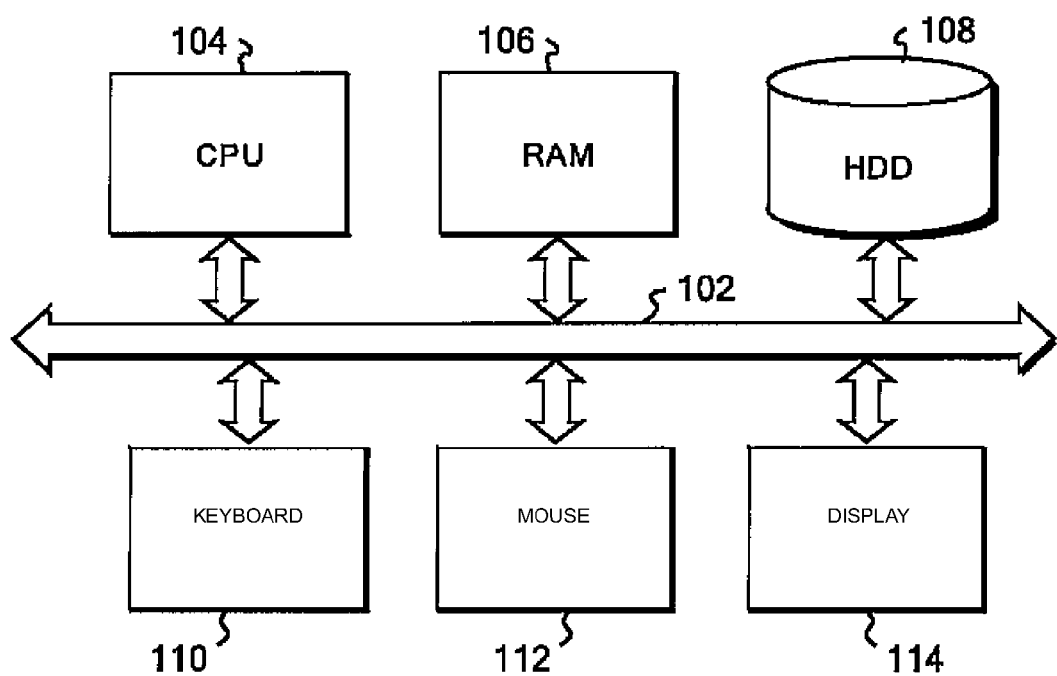
FIG. 1 displays a block diagram of a hardware configuration example for carrying out the present invention.

The system according to the present invention first creates, from corpora, a technical term set in a first language (Japanese, for example), a general term set in the first language, a technical term set in a second language (English, for example), and a general term set in the second language.

The system according to the present invention then creates bipartite graphs respectively for the first and second languages by connecting terms in the technical term set and the general term set in the same language by using links on the basis of information on the corpora.

The system according to the present invention then connects the bipartite graphs by linking general terms in the different languages with links between the general terms based on a translation dictionary for general terms between the different languages (English to Japanese dictionary, for example).

The system according to the present invention then calculates a similarity between each word in the technical terms in the first language and each word in the technical terms in the second language by the score of a random walk.

In order to perform this calculation, the system according to the present invention first creates an association matrix M on the basis of information on the weighted links in the bipartite graphs in the same language and in the bipartite graph between the different languages. Here, each of the links between the technical term set and the general term set in the same language is weighted by, for example, a co-occurrence frequency or the degree of co-occurrence correlation that can be calculated by a predetermined text mining tool.

Moreover, the weights of the links between the general terms in the different languages are calculated on the basis of an ordered sequence in the dictionary, for example.

When the association matrix M is obtained in the manner described above, the system according to the present invention then calculates a similarity matrix Q by the equation $Q=(1-c)(I-cM)^{-1}$. Here, c is an appropriate positive number smaller than one. Since the value to be obtained herein is a similarity between a technical term in the first language and a technical term in the second language, only a submatrix of the similarity matrix Q is needed.

The system according to the present invention then outputs words in the technical terms in the second language in descending order of the similarities from words in the technical terms, or query terms, in the first language on the basis of corresponding components of the similarity matrix Q.

According to the present invention, there is provided a technique that makes it possible to list a word set in a different language by using a random walk technique using matrix calculations of an association matrix with a reasonable calculation amount of space and time even when a large number of query terms are targeted.

Hereinafter, an embodiment of this invention will be described on the basis of the drawings. Unless otherwise noted, the same reference numerals denote the same objects throughout the drawings. Note that, it should be understood that what is described below is an embodiment of the present invention and thus has no intention to limit this invention to the specific form disclosed in this embodiment.

Referring to FIG. 1, there is shown a block diagram of computer hardware for implementing a system configuration and processing according to an embodiment of the present invention. In FIG. 1, a CPU 104, a main memory (RAM) 106, a hard disk drive (HDD) 108, a keyboard 110, a mouse 112 and a display 114 are connected to a system bus 102. The CPU 104 is preferably based on a 32-bit or 64-bit architecture. Pentium (trademark) 4 or Core (trademark) 2 Duo of Intel Corporation, or Athlon (trademark) of AMD or the like can be used for the CPU 104, for example. The main memory 106 preferably has a capacity of 4 GB or larger. The hard disk drive 108 preferably has a capacity of 500 GB or larger, for example, so that a large amount of data can be stored therein.

Although not illustrated, an operating system is previously stored in the hard disk drive 108 and operates after being booted by BIOS and loaded into the main memory 106 at start up of the system. The operating system can be any operating system that is compatible with the CPU 104, such as Linux (trademark), or Windows XP (trademark) or Windows (trademark) 7 of Microsoft Corporation, or Mac OS (trademark) of Apple Inc.

Furthermore, the hard disk drive 108 stores therein: a matrix creation routine for creating a matrix indicating the degree of association (hereinafter, referred to as an association matrix) between corpus data, dictionary data and terms to be described later; a matrix calculation routine for calculating a similarity matrix for a random walk from the association matrix; and the like. These data files and details of the processing routines will be described later with reference to FIG. 2.

The keyboard 110 and the mouse 112 are used to start a program (not shown) loaded from the operating system or the hard disk drive 108 into the main memory 106 and displayed on the display 114 and to input characters.

The display 114 is preferably a liquid crystal display and an LCD having a resolution desired by the user such as XGA (1024×768 resolution) or UXGA (1600×1200 resolution) can be used, for example. The display 114 is used to display an operation window to start the processing according to the present invention or a list of related technical terms or the like obtained as a result of the processing both of which are not illustrated.

Next, the processing routines for carrying out the present invention and the data files or the like to be prepared will be described with reference to the functional block diagram of FIG. 2. Note that, although a description is given of a case where correspondence between a Japanese term and an English term is found in this embodiment, it should be understood that the present invention is applicable not only to Japanese and English but also to any two different foreign languages.

Figure 2:
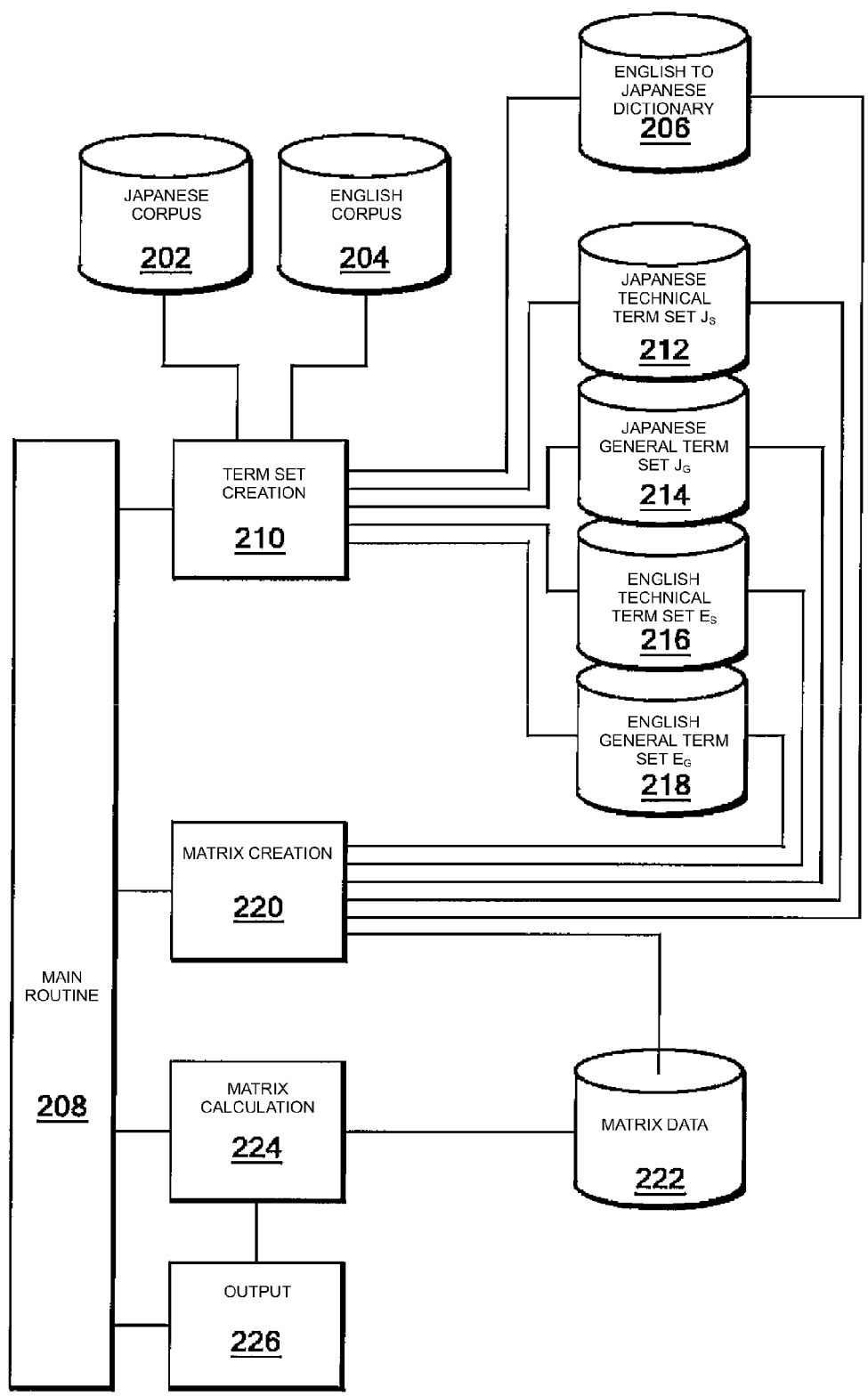
FIG. 2 displays a block diagram of a functional configuration example for carrying out the present invention.

In FIG. 2, a Japanese corpus 202, an English corpus 204 and an English to Japanese dictionary 206 are files previously prepared and saved in the hard disk drive 108.

A main routine 208 is a processing program having functions to start and stop overall processing, to designate a file to be processed and an option parameter and the like, and is written in an existing programming language desired by the user such as C, C++, C#, Java® or the like. The program in an executable format is saved in the hard disk drive 108 and loaded into the main memory 106 and executed by a function of the operating system in response to operation through the keyboard 110 or the mouse 112 by the user.

A term set creation routine 210 is written in an existing programming language desired by the user such as C, C++, C#, Java® or the like so as to be callable from the main routine 208 and is preferably statically linked with a program in the same executable format as that of the main routine 208 or saved in the hard disk drive 108 as an individual dynamic link file.

The term set creation routine 210 reads contents of the Japanese corpus 202 and the English corpus 204 to create a Japanese technical term set 212, a Japanese general term set 214, an English technical term set 216 and an English general term set 218 and save them in the hard disk drive 108 as files. As the processing for this, it is possible to use the technique described in Japanese Patent Application Publication No. 2002-269085, Japanese Patent Application Publication No. 2008-146218 or Japanese Patent Application Publication No. 2010-55298 or the like cited above as a patent literature, or an existing text mining tool such as IBM® Content Analytics.

The term set creation routine 210 preferably accesses the English to Japanese dictionary 206 to create a link between the technical term set and the general term set, calculate the degree of association such as a co-occurrence frequency or the degree of co-occurrence correlation as a weight of the link and save the information in advance so as to allow the information to be used by a matrix creation routine 220 to be described below.

The matrix creation routine 220 is written in an existing programming language desired by the user such as C, C++, C#, Java® or the like so as to be callable from the main routine 208 and is preferably statically linked with a program in the same executable format as that of the main routine 208 or saved in the hard disk drive 108 as an individual dynamic link file. The matrix creation routine 220 creates an association matrix M from the Japanese technical term set 212, the Japanese general term set 214, the English technical term set 216 and the English general term set 218, which are created by the term set creation routine 210, and the English to Japanese dictionary 206. Each component of the association matrix M is a weight characterized by a co-occurrence frequency or the degree of co-occurrence correlation between terms. The matrix creation routine 220 has a function to write data of the created association matrix M to the hard disk drive 108 as matrix data 222. Note that, the matrix creation routine 220 can be implemented as a part of the function of the term set creation routine 210 instead of being an independent routine.

A matrix calculation routine 224 is also written in an existing programming language desired by the user such as C, C++, C#, Java® or the like so as to be callable from the main routine 208 and is preferably statically linked with a program in the same executable format as that of the main routine 208 or saved in the hard disk drive 108 as an individual dynamic link file. The matrix calculation routine 224 has a function to read the matrix data 222 written to the hard disk drive 108 and then to calculate a similarity matrix Q from the association matrix M. This specific processing will be described later in more detail.

An output routine 226 is also written in an existing programming language desired by the user such as C, C++, C#, Java® or the like so as to be callable from the main routine 208 and is preferably statically linked with a program in the same executable format as that of the main routine 208 or saved in the hard disk drive 108 as an individual dynamic link file. The output routine 226 has a function to display, on the display 114, a result such as correspondence between technical terms in Japanese and English from the similarity matrix Q from a result of calculation by the matrix calculation routine 224, and also to write the result to the hard disk drive 108 as a file.

Next, the processing according to the present invention will be described with reference to the flowchart in FIG. 3. In step 302 in FIG. 3, the main routine 208 calls the term set creation routine 210. Then, the term set creation routine 210 reads contents of the Japanese corpus 202 and the English corpus 204, then creates a Japanese technical term set ($J_S$) 212, a Japanese general term set ($J_G$) 214, an English technical term set ($E_S$) 216 and an English general term set ($E_G$) 218 and then save them in the hard disk drive 108 as files.

The term set creation routine 210 creates bipartite graphs by connecting technical terms and general terms in the same language by links on the basis of information on the corpora in step 304. Here, each of the bipartite graphs is a graph whose vertex set can be divided into two subsets such that no link is formed between vertices in the same subset. One of the subsets is a general term set and the other is a technical term set.

The term set creation routine 210 identifies a technical term as a term appearing only in limited context in a corresponding one of the corpora. The term set creation routine 210 can extract a technical term with reference to the technical terms in a certain field such as the information processing related or automobile related field.

Meanwhile, the term set creation routine 210 recognizes a general term as a term highly related to a technical term and appearing in a relatively large number of documents. The term set creation routine 210 forms a bipartite graph by defining the technical term set and the general term set in the corpus first, and thereby forming links there between on the basis of the degrees of association. During this processing, each of the links is weighted by a degree of association.

The weight of the degree of association is preferably a co-occurrence frequency or the degree of co-occurrence correlation. The co-occurrence frequency or the degree of co-occurrence correlation can be calculated by using the existing text mining tool such as IBM® Content Analytics or the like, for example.

Figure 4:
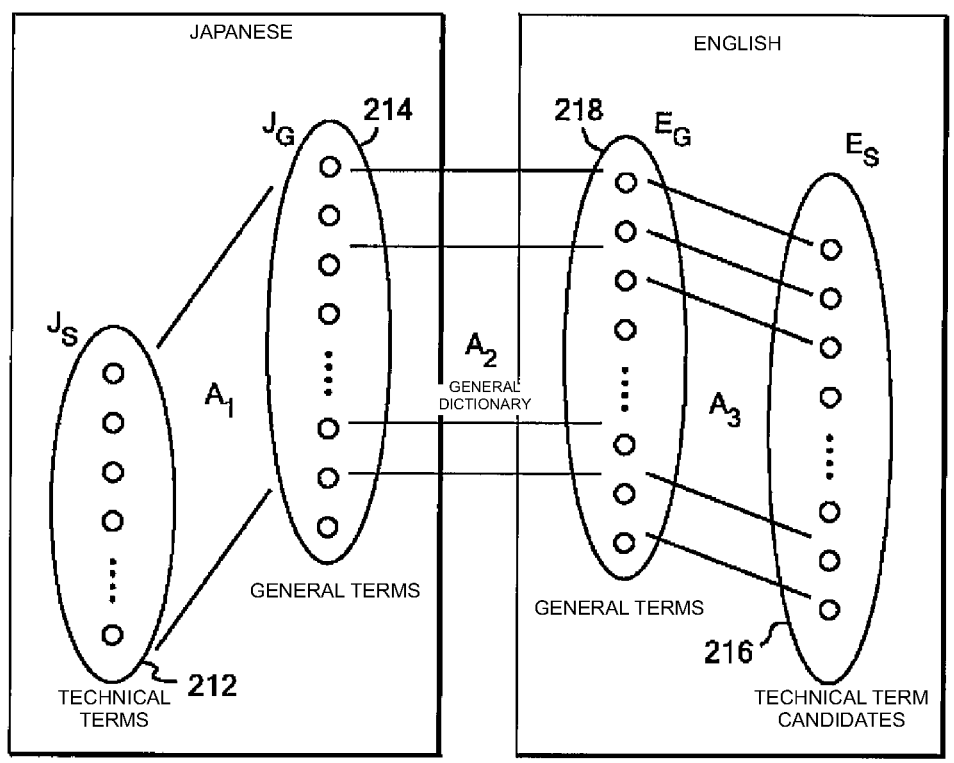
FIG. 4 displays a diagram showing links between a Japanese technical term set, a Japanese general term set, an English technical term set and an English general term set.

FIG. 4 shows bipartite graphs between the technical term sets and the general term sets in Japanese and English. To put it specifically, links $A_1$ are formed between the technical term set $J_S$ and the general term set $J_G$ in Japanese and links $A_3$ are formed between the technical term set $E_S$ and the general term set $E_G$ in English. Here, in general, several thousands of words are included in the general term set $J_G$ and several hundreds of words are included in the technical term set $J_S$, while several thousands of words are also included in the general term set $E_G$, but several tens of thousands of words can be included in the technical term set $E_S$ because the words are only candidates at this stage.

Figure 3:
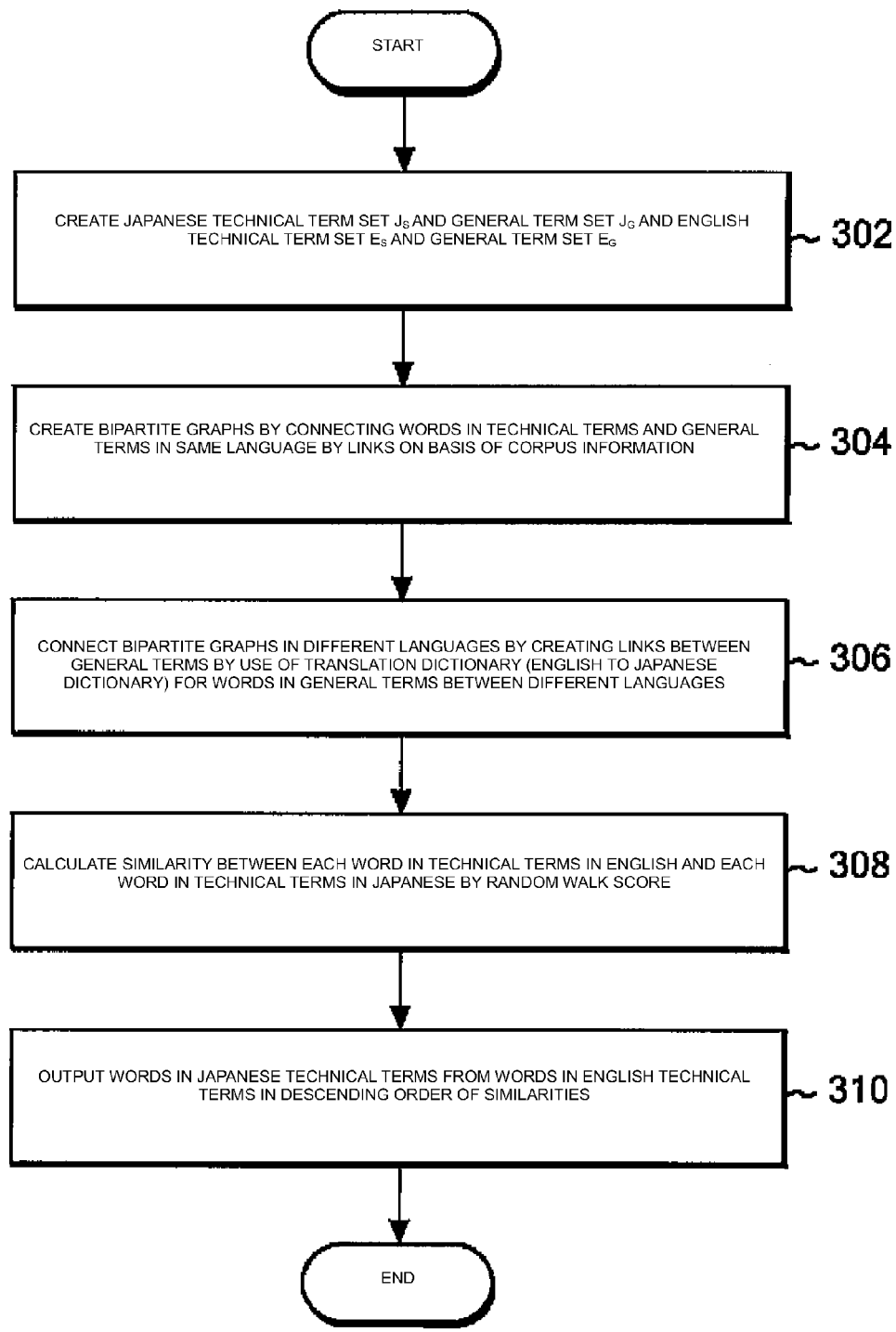
FIG. 3 displays a schematic flowchart of entire processing of the present invention using Japanese and English terms as an example.

Referring back to the flowchart in FIG. 3, in step 306, the term set creation routine 210 connects the bipartite graphs in the different languages by creating links between the general terms by use of a translation dictionary (English to Japanese dictionary 206) for words in general terms between different languages, i.e., Japanese and English in this case. The weights of the links between elements herein are preferably set in accordance with the listed sequence in the dictionary, but the same value can be used. The links thus created are shown in FIG. 4 as links $A_2$.

In this respect, the objective below is to find a combination of terms (j, e) such as (j, e)∈$J_S$×$E_S$.

In step 308, the matrix creation routine 220 first creates an association matrix M in accordance with the links of the bipartite graph in FIG. 4 and their weight information for calculation of the score of a random walk.

Figure 5:
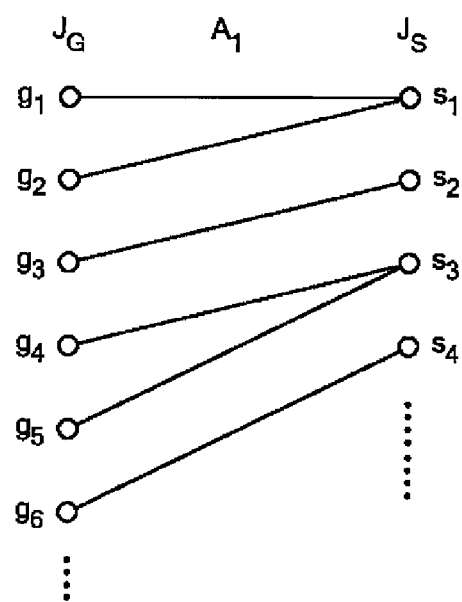
FIG. 5 displays a diagram showing examples of links in a bipartite graph.

The processing above is understood with reference to FIG. 5 and FIG. 6. FIG. 5 is a diagram showing an example of the links $A_1$ between elements $g_1$, $g_2$, $g_3$, $g_4$, $g_5$, $g_6$ . . . of the Japanese general term set $J_G$ and elements $s_1$, $s_2$, $s_3$, $s_4$ . . . of the Japanese technical term set $J_S$.

FIG. 6 is a diagram showing part of the elements of the association matrix M corresponding to the bipartite graph in FIG. 5. The co-occurrence frequency between the element $g_i$ of $J_G$ and the element $s_j$ of $J_G$ is $M_{ij}$ in a generalized term. Moreover, an element at a position where no link exists is 0.

FIG. 7 shows an overall association matrix M created by the matrix creation routine 220 on the basis of the links $A_1$ between the Japanese technical term set $J_S$ and the Japanese general term set $J_G$, the links $A_2$ between the Japanese general term set $J_G$ and the English general term set $E_G$ and the links $A_3$ between the English technical term set $E_S$ and the English general term set $E_G$. In FIG. 7, $A_1$ and $A_1^T$, $A_2$ and $A_2^T$ and $A_3$ and $A_3^T$ correspond to an association matrix created on the basis of the links $A_1$ and its transposed matrix, an association matrix created on the basis of the links $A_2$ and its transposed matrix and an association matrix created on the basis of the links $A_3$ and its transposed matrix, respectively. Here, |$J_S$|,  |$J_G$|, |$E_S$| and |$E_G$| respectively represent the numbers of elements of the sets $J_S$, $J_G$, $E_S$ and $E_G$. 0 indicates a zero matrix in the shown size.

To put it differently, the matrix creation routine 220 creates the overall association matrix M as a set of the submatrices. Moreover, the matrix creation routine 220 normalizes the overall association matrix M such that the sum of each row is equal to one. The meaning of this normalization will become apparent in the following description.

The step of calculating a similarity between each word in the English technical terms and each word in the Japanese technical terms by the score of a random walk in step 308 in FIG. 3 is to calculate, by the matrix calculation routine 224 on the basis of the association matrix M, the similarity matrix Q defined by the following formula.

$$Q_{ij} = c \sum_k Q_{ij} \frac{M_{kj}}{\sum_l M_{kl}} + (1-c)\delta_{ij} \qquad \text{[Equation 1]}$$

Here, c is a positive constant smaller than one and is preferably a value from about 0.2 to about 0.3. $\delta_{ij}$ is a Kronecker delta, and c and $(1-c)\delta_{ij}$ represent escaping and restarting parameters of a random walk with restart.

Figure 8:
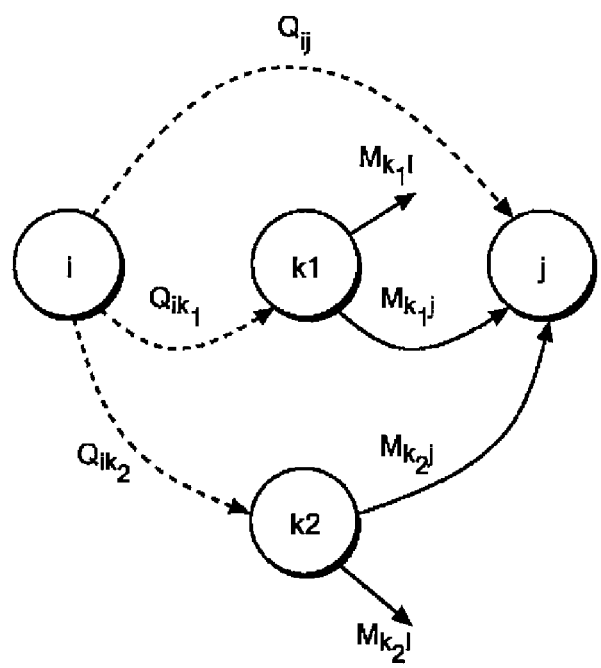
FIG. 8 displays a diagram showing a random walk.

FIG. 8 is a diagram showing an aspect of the random walk by components of the similarity matrix Q and components of the association matrix M.

Here, the above described formula is simplified as follows by row normalization of the association matrix M.

$$Q_{ij} = c \sum_k Q_{ij} M_{kj} + (1-c)\delta_{ij} \qquad \text{[Equation 2]}$$

When the formula is written in matrix notation by transposition of terms, the following formula is obtained:

$(1-cM)Q=(1-c)I$

Here, I is a unit matrix in the same size as that of M and Q.

When the above formula is modified for Q, the following formula is obtained.

$Q=(1-c)(1-cM)^{-1}$

The role of the matrix calculation routine 224 is to calculate the similarity matrix Q from the association matrix M by using the above described formula. Here, (1−c) is a constant. Thus, if (1−c) is omitted with an assumption that (1−c) is 1, Q is expressed as shown in FIG. 9. In particular, the right side of a lower equation shows partitions of submatrices of Q as a result of calculation, and $Q_{22}$ corresponding to $J_S$×$E_S$ is the value desired for the objective of the present invention.

Normally, (1−cM) is an extremely large matrix of several tens of thousands of elements by several tens of thousands of elements, however. Thus, calculation of an inverse matrix in a straightforward manner is generally inefficient and often impossible in view of the calculation time and space.

In this respect, a matrix is created in which some submatrices of (1−cM) are each set to 0 as shown in FIG. 10, i.e., a matrix (1−cM') in which only a portion corresponding to the random walk on the Japanese general term set and the Japanese technical term set and another portion corresponding to the random walk on the English general term set and the English technical term set are left. Then, when an inverse matrix of this smaller matrix is obtained, the inverse matrix of the larger one can be relatively easily obtained as shown in the matrix shown in the right side of a lower equation in FIG. 10.

However, $Q_{22}$ to be obtained is not included herein, so that $Q_{22}$ is calculated by the following formula using $Q'_{12}$ and $Q_{32}$.

$$Q_{22} = Q'_{12} A_2 Q_{32} \quad \text{[Equation 3]}$$

Here, $Q_{32}$ is then obtained by the following formula.

$$Q_{32} = (I - Q'_{31} A_2{}^T X_4 A_2) Q'_{32} \quad \text{[Equation 4]}$$

Furthermore, $X_4$ is calculated by the following formula and thus, $Q_{22}$ is obtained.

$$\begin{pmatrix} X_1 & X_2 \\ X_3 & X_4 \end{pmatrix} = \begin{pmatrix} I & -cA_1 \\ -cA_1^T & I - A_2 Q'_{31} A_2^T \end{pmatrix}^{-1} \quad \text{[Equation 5]}$$

Upon completion of the calculation of $Q_{22}$ by the matrix calculation routine 224 as described above, the output routine 226 sorts, in accordance with the value of the components of $Q_{22}$, the Japanese technical terms associated with the components and the English technical term set corresponding to the Japanese technical terms, and then displays the Japanese technical terms and the English technical term sets sequentially on the display 114 or writes them to the hard disk drive 106 as files.

The above displayed or written information can be used as a collection of candidate translation words, or related words of the English technical terms for the Japanese technical terms or as a collection of candidate translation words, or related words of the Japanese technical terms for the English technical terms.

The example in which correspondence between terms in Japanese and English is calculated has been described so far. However, it should be understood that the present invention can be used in calculation of correspondence not only between Japanese and English but also between any two languages for which a general term dictionary exists.

Moreover, although a co-occurrence frequency is used as a component of an association matrix in the above described embodiment, any index used as the degree of association between two terms by a text mining tool can be used.

Furthermore, it should be understood for a person skilled in the art that the present invention is not limited to specific hardware or software of a computer and can be carried out on any platform regardless of whether the platform is in a stand-alone environment or a network environment.

What is claimed is:

1. A computer system configured to find correspondence between terms in two different languages, the system comprising:
   a unit configured to create a technical term set in a first language, a general term set in the first language, a technical term set in a second language and a general term set in the second language;
   a storage unit for storing the term set of the first language, the general term set in the first language, the technical terms set in the second language and the general term in the second language;
   a unit configured to create at least two bipartite graphs, wherein the first bipartite graph connects the technical term set and the general term set of the first language to each other with links on the basis of corpus information, wherein the second bipartite graph connects the general term set and technical term set of the second language to each other with links on the basis of corpus information, and wherein each of the links is weighted by a degree of association between terms;
   a unit configured to create a third bipartite graph by creating links between general terms in the first language and general terms in the second language by using a translation dictionary between general terms in the first language and general terms in the second language, each of the links being weighted by a degree of association between terms;
   a unit configured to create an association matrix M including the bipartite graphs between the technical term set and the general term set connected in each respective language and the bipartite graph between the general terms in the first language and the general terms in the second language, wherein the association matrix M is normalized such that a sum of each row is equal to one;
   a unit configured to calculate a similarity matrix Q by calculation of an inverse matrix (I−cM) of a matrix in which only a portion corresponding to both of the general term set in the first language and the technical term set in the first language and a portion corresponding to both of the general term set in the second language and the technical term set in the second language are left, where c is a positive number smaller than one; and
   a unit configured to output correspondence between the technical term set in the first language and the technical term set in the second language on the basis of predetermined components of the similarity matrix Q,
   wherein said unit configured to create the association matrix M includes creating a set of submatrices comprising:
   a submatrix created on the basis of links between the technical term set and the general term set in a first language and its transposed submatrix,
   a submatrix created on the basis of links between the technical term set and the general term set in a second language and its transposed submatrix, and
   a submatrix created on the basis of links between the general term set in the first language and the general term set in the second language and its transposed submatrix.

2. The system according to claim 1, wherein the degree of association between the technical term set and the general term set corresponding to a same language in each of the bipartite graphs is either a co-occurrence frequency or a degree of co-occurrence correlation between terms.

3. The system according to claim 1, wherein the degree of association between the general terms in the first language and the general terms in the second language in the bipartite graph that links terms between the two languages is calculated on the basis of a listed sequence in the dictionary.

4. The system according to claim 1, wherein the c is a number from about 0.2 to about 0.3.

5. The system according to claim 1, wherein the technical term sets of the first and second languages comprise terms in an information processing field.

6. The system according to claim 1, wherein the technical term sets of the first and second languages comprise terms in an automobile field.

7. The system according to claim 1, wherein the at least two bipartite graphs comprises a graph whose vertex is divided into two subsets such that no line is formed between vertices in the same subset.

8. The system according to claim 1, wherein the unit configured to output correspondence outputs correspondence between the technical term set in the first language and the technical term set in the second language in a descending order of similarities.

9. The system according to claim 1, wherein the similarity matrix Q comprises an inverse set of the submatrices, wherein the submatrix created on the basis of links between the general term set in the first language and the general term set in the second language and its transposed submatrix are each set to zero.

10. The system according to claim 9, further comprising calculating a similarity matrix for the technical term set in the first language and the technical term set in the second language.

* * * * *